(12) United States Patent
Ueda et al.

(10) Patent No.: US 6,340,016 B1
(45) Date of Patent: Jan. 22, 2002

(54) STARTING DEVICE AND CONTROL METHOD THEREOF FOR DIRECT-INJECTION INTERNAL COMBUSTION ENGINE

(75) Inventors: Katsunori Ueda, Okazaki; Kuniaki Kaihara, Toyota; Hiromitsu Ando, Okazaki; Jun Takemura, Toyota, all of (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,990

(22) Filed: Mar. 17, 2000

(30) Foreign Application Priority Data

| Mar. 18, 1999 | (JP) | ............................................. 11-073362 |
| Dec. 17, 1999 | (JP) | ........................................... 11-359083 |

(51) Int. Cl.$^7$ ............................................. F02M 31/00
(52) U.S. Cl. ..................................... 123/305; 123/491
(58) Field of Search ................................ 123/305, 295, 123/430, 491

(56) References Cited

U.S. PATENT DOCUMENTS 4,784,098 A * 11/1988 Artman ...................... 123/262
5,078,107 A * 1/1992 Morikawa .................... 123/295
5,603,301 A * 2/1997 Sakurai et al. ............... 123/430

FOREIGN PATENT DOCUMENTS

| JP | 5332177 A | 12/1993 |
| JP | 8177699 A | 7/1996 |

* cited by examiner

Primary Examiner—Henry C. Yuen
Assistant Examiner—Mahmoud Gimie

(57) ABSTRACT

A starting device for a direct-injection internal combustion engine by which starting can be completed swiftly, and trouble caused by self-ignition and sudden combustion by carrying out a normal spark-ignition can be prevented surely upon starting. The starting device has compression stroke cylinder identifying unit for identifying a cylinder whose piston is in its compression stroke while the internal combustion engine is stopped; start request determining unit for determining whether there is an engine start request; and start control unit for, when it is determined by the start request determining unit that there is an engine start request, injecting fuel into the compression stroke cylinder identified by the compression stroke cylinder identifying unit.

24 Claims, 12 Drawing Sheets

STARTING DEVICE AND CONTROL METHOD THEREOF FOR DIRECT-INJECTION INTERNAL COMBUSTION ENGINE

BACKGROUND OF THE INVENTION

This invention relates to a starting device for use in a direct-injection internal combustion engine (hereinafter, "engine"), wherein fuel is injected into combustion chambers directly.

In recent years, to achieve reductions in emissions and improvements in fuel economy, direct-injection engines, wherein fuel is injected directly into combustion chambers, have been brought to use. This kind of engine is constructed such that it is possible to switch between a uniform combustion, wherein fuel is injected during the intake stroke to create a uniform mixture in the combustion chamber, and a stratified combustion, wherein fuel is injected during the compression stroke to create a stratified mixture. In the stratified combustion, after a mixture close to a theoretical air/fuel ratio is created around a spark plug, an extremely lean mixture is realized in the combustion chamber as a whole. The stratified combustion is generally limited to low-speed, low-load operating regions; however, in an engine disclosed in Japanese Unexamined Patent Publication No. H.10-30468, when the engine temperature is above a set temperature and the fuel pressure is above a set pressure, a stratified combustion is effected with a compression stroke injection from the time of starting.

In the engine disclosed in the above-mentioned publication, the object of effecting the stratified combustion from starting is to obtain the emissions and fuel economy benefits of the stratified combustion from the time of starting. Accordingly, the control procedure for starting is the same as in an ordinary engine. In this control procedure, first, a cylinder identification is carried out at the commencement of cranking, and when, after the completion of this cylinder identification, a cylinder reaches its compression stroke, a fuel injection into this cylinder is executed with a predetermined injection quantity and a predetermined injection timing.

That is, in the engine of the above-mentioned publication, no consideration is given to shortening of the time required for starting, and it is not possible to satisfy a desire to shorten the starting time. Delay in engine starting is a problem even in an ordinary vehicle, but particularly in hybrid vehicles and idle-stop vehicles which have come into use in recent years, there is the problem that when there is a delay in starting, it is impossible to exploit their advantages fully. For example, in a hybrid vehicle, which uses both a motor and an engine as drive sources, starts the engine to obtain output (for example when accelerating from low-load travel under motor drive), any delay in starting the engine causes the output to fall temporarily and reduces acceleration responsiveness. In an idle-stop vehicle, wherein the engine is automatically stopped when the vehicle halts at a stop signal of a traffic signal at a road junction or a pedestrian crossing (hereinafter, referred to as halting at a traffic signal or the like), the problem arises that an engine starting delay leads directly to a delay in starting of the vehicle.

Also, depending on the running state of the engine, progress of a precursor reaction, undergone by fuel injected into a cylinder during the compression stroke, may cause the combustion rate following a spark-firing to become rapid, or may progress the precursor reaction and give rise to a self-ignition before a spark-ignition for the injected fuel.

Here, the precursor reaction refers to a phenomenon of hydrocarbons in a fuel decomposing under heat and undergoing a low-temperature oxidation reaction. In this low-temperature oxidation reaction, unlike in combustion ensuing from spark-firing or high temperature combustion, such as combustion caused by flame propagation, fuel combusts gently at a low temperature. If a precursor reaction proceeds, without spark-firing and throughout the combustion chamber, many flame nuclei arise substantially simultaneously and cause self-ignition.

Under these circumstances, trouble such as an increase in engine vibration, the occurrence of knocking, or carbon getting into the injection port of a fuel injection valve exposed in the combustion chamber arises.

SUMMARY OF THE INVENTION

It is therefore an object of the present invention to provide a starting device for a direct-injection internal combustion engine with which starting can be completed swiftly.

It is another object of the present invention to provide a starting device for a direct-injection internal combustion engine with which starting can be completed swiftly and also trouble caused by a self-ignition and sudden combustion can be prevented by normal spark-ignition being carried out reliably upon starting.

To achieve these and other objects, in a first preferred embodiment of the invention, a starting device for a direct-injection internal combustion engine, wherein fuel can be injected into cylinders directly, has a cylinder identifying means for performing cylinder identification of the internal combustion engine while the internal combustion engine is stopped; start request determining means for determining whether there is an engine start request of the internal combustion engine; and start control means for injecting fuel into a cylinder in a compression stroke identified by the cylinder identifying means when it is determined by the start request determining means that there is an engine start request of the internal combustion engine.

Accordingly, in a starting device for a direct-injection internal combustion engine of the invention pertaining to this invention, starting of the engine can be completed swiftly because when cranking is commenced for starting, fuel is immediately injected into the cylinder positioned in its compression stroke, and thus a subsequent spark-firing a first combustion is effected quickly.

In another mode of the present invention, the starting device for a direct-injection internal combustion engine has engine temperature detecting means for detecting an engine temperature of the internal combustion engine; piston position detecting means for detecting the position of a piston in the identified compression stroke cylinder; and ignition region determining means for determining, on the basis of the engine temperature detected by the engine temperature detecting means and the piston position detected by the piston position detecting means, whether or not fuel injected into the identified cylinder in the compression stroke will be in an ignition region.

By this means, it is possible to swiftly complete the start of the engine while preventing an ignition failure because injection of fuel into a cylinder in a compression stroke is carried out after determining whether or not fuel injected into the identified cylinder in a compression stroke will be in an ignition region based on the engine temperature and the piston position of the cylinder in the compression stroke by the cylinder identifying means.

In another mode of the present invention, the starting device for a direct-injection internal combustion engine has piston position correcting means for moving the position of the piston of either the identified cylinder in a compression stroke or the cylinder to enter its compression stroke next after the identified cylinder in the compression stroke so that the position of the piston becomes such that fuel injected into the cylinder will be in an ignition region when it is determined that the piston position detected by the piston position detecting means is such that fuel injected into the identified cylinder in the compression stroke will not be in an ignition region. Because by this means, it is possible for the position of the piston to be moved so that injected fuel will be in an ignition region, through fuel injection to a cylinder positioned in its compression stroke being carried out immediately at that time, by a subsequent spark-firing a first combustion can be effected quickly and starting completed swiftly.

To achieve the above-mentioned object and other objects, in the second form of the present invention, a starting device for a direct-injection internal combustion engine has cylinder identifying means for performing cylinder identification of the internal combustion engine while the internal combustion engine is stopped; piston position detecting means for detecting a position of a piston in a cylinder identified by the cylinder identifying means; start request determining means for determining whether or not there is an engine start request of the internal combustion engine; combustion parameter setting means for setting a fuel injection quantity and a fuel injection timing in correspondence with the piston position detected by the piston position detecting means to suppress abnormal combustion of the injected fuel; and start control means for controlling fuel injection for the identified cylinder on the basis of the fuel injection quantity and the fuel injection timing set by the combustion parameter setting means when it is determined by the start request determining means that there is an engine start request of the internal combustion engine.

Accordingly, in a starting device for a direct-injection internal combustion engine of the above invention, as a result of the provision of the construction described above, a fuel injection quantity and a fuel injection timing are set to suppress abnormal combustion of the injected fuel. Therefore, starting of the engine can be completed swiftly because when cranking is commenced for starting, fuel injection is carried out immediately into the identified cylinder at that time, and thus a subsequent spark-firing a first combustion is effected quickly. That is, with this invention, it is possible to swiftly complete the start and fuel can be combusted surely by spark-firing on starting. Therefore, it is possible to prevent trouble caused by a self-ignition and sudden combustion (for example, an increase in engine vibration, occurrence of knocking, or carbon getting into the injection port of a fuel injection valve).

In another mode of the second form of the present invention, the combustion parameter setting means sets the fuel injection quantity further to the increase side as the piston position, before starting of the internal combustion engine, is closer to bottom dead center. This is because, in a cylinder stopped in its compression stroke, as the piston position is closer to bottom dead center, the pressure rise of when the piston moves toward top dead center becomes greater, and thus the self-ignition or sudden combustion is more likely to occur. For a cylinder stopped in its intake stroke, as the piston position is closer to bottom dead center, the amount of residual gas in the cylinder is greater, the amount of fuel from the intake port is less, and thus it is more likely that a self-ignition occurs. Because the fuel injection quantity is increased to match these tendencies, the temperature in the cylinder is lowered by heat of vaporization of fuel. Therefore, starting can be completed swiftly, and trouble caused by the self-ignition and sudden combustion of the kind described above can be prevented by normal spark-ignition being carried out reliably upon starting.

In another mode of the second form of the present invention, the combustion parameter setting means sets an ignition timing to suppress an abnormal combustion of the injected fuel, and the start control means, when it is determined by the start request determining means that there is an engine start request of the internal combustion engine, controls fuel injection for the identified cylinder on the basis of the fuel injection quantity and the fuel injection timing set by the combustion parameter setting means and then controls ignition for the injected fuel into the identified cylinder on the basis of the ignition timing set by the combustion parameter setting means. In this mode, the combustion parameter setting means preferably sets the ignition timing more to the retard side as the piston position, before starting of the internal combustion engine, is closer to bottom dead center.

By this means in this mode, by the ignition timing being set more to the retard side the closer the piston position is to bottom dead center, trouble caused by self-ignition and sudden combustion of the kind described above can be prevented more reliably. For example, for a cylinder stopped in its compression stroke, as the piston position is closer to bottom dead center the pressure rise of when the piston moves toward top dead center is greater, and thus the combustion rate (the combustion speed with respect to crank angle) is more rapid. For a cylinder in its intake stroke, as the piston position is closer to bottom dead center, the amount of residual gas in the cylinder is greater and the amount of intake air from the intake port is less, and thus the temperature in the cylinder during compression is higher and the combustion speed is more rapid. Because the ignition timing is retarded to match these tendencies, the pressure in the cylinder, after ignition is lowered and the combustion rate is suppressed.

In another mode of the second form of the present invention, there are provided engine temperature detecting means for detecting an engine temperature of the internal combustion engine, and the combustion parameter setting means sets a basic fuel injection quantity and a basic fuel injection timing in correspondence with the piston position detected by the piston position detecting means and the engine temperature detected by the engine temperature detecting means, and the combustion parameter setting means corrects at least one of the combustion parameters that are the set basic fuel injection quantity and the set basic fuel injection timing for the identified cylinder in correspondence with the piston position detected by the piston position detecting means to suppress abnormal combustion of the injected fuel. Also, in this mode, the combustion parameter setting means sets a basic ignition timing for the injected fuel into the identified cylinder in correspondence with the piston position detected by the piston position detecting means and the engine temperature detected by the engine temperature detecting means, and the combustion parameter setting means corrects the combustion parameter that is the set basic ignition timing in correspondence with the piston position detected by the piston position detecting means to suppress abnormal combustion of the injected fuel.

In the starting device for a direct-injection internal combustion engine of the second form of the present, as a result of the provision of the construction described above, at least one of the combustion parameters that are the basic fuel injection quantity and the basic fuel injection timing set by the combustion parameter setting means is corrected in correspondence with the piston position detected by the piston position detecting means to suppress abnormal combustion of the injected fuel. Therefore, when cranking is commenced for starting, the starting can be completed swiftly because fuel injection to the cylinder, into which fuel should be injected, is executed immediately at that time, and thus a subsequent spark-firing a first combustion is effected quickly. That is, with this invention, because it is possible for starting to be completed swiftly and fuel can be made to combust reliably by spark-firing upon starting while an abnormal combustion being suppressed, it is possible to prevent trouble caused by self-ignition and sudden combustion.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Preferred embodiments of the invention will now be described. A first preferred embodiment of a starting device for a direct-injection internal combustion engine, according to the present invention for use in an idle-stop vehicle, is shown in FIG. 1 through FIG. 9.

Figure 1:
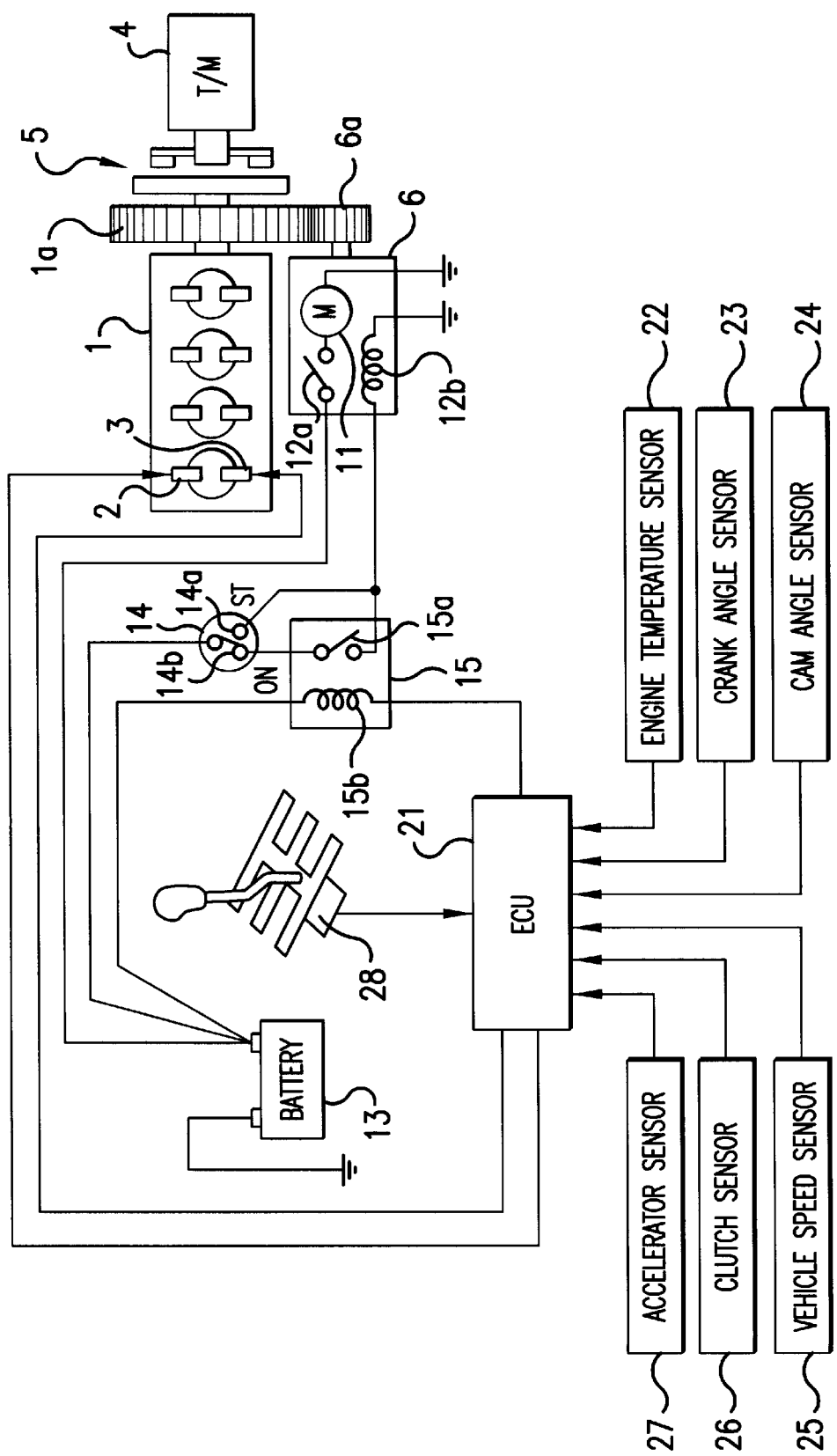
FIG. 1 is an overall construction diagram showing a starting device for a direct-injection internal combustion engine of a first preferred embodiment of the invention.

In FIG. 1, reference numeral 1 denotes a direct-injection internal combustion gasoline engine 1 having a four-stroke, in-line four-cylinder engine firing at a uniform spacing of 180° crank angle (hereinafter, "CA"); in each of its cylinders a spark plug 2 is mounted and a fuel injection valve 3 is mounted to be capable of injecting fuel directly into the combustion chamber.

The combustion chambers and intake passages and so on of the engine 1 are designed exclusively for direct injection. When fuel is injected during a compression stroke, the injected fuel is moved toward the spark plug 2 by a reverse tumble flow created by air entering a combustion chamber during the intake stroke, and a mixture close to a theoretical air/fuel ratio is thereby formed around the spark plug 2. By combusting this mixture, a stratified combustion is made possible with the air/fuel ratio of the combustion chamber as a whole being kept extremely lean.

A manual transmission 4 is connected to the engine 1, and this transmission is connected to driving wheels of the vehicle by way of differential gears. A clutch 5 is provided between the engine 1 and the transmission 4, and this clutch 5 controls power transmission from the engine 1 side to the transmission 4 side in correspondence with clutch pedal operations (not shown) by a driver. A permanently-meshing starter 6 is mounted on the engine 1, and a pinion gear 6a of the starter 6 meshes permanently with a flywheel 1a of the engine 1. A one-way clutch (not shown) is mounted on a flywheel 1a; during starting, this one-way clutch effects cranking by transmitting drive from the starter 6 to the engine 1 side, and after starting is completed it idles and thereby prevents the starter 6 from being counter-driven by the engine 1.

A motor 11 of the starter 6 is connected to a battery 13 by way of normally-open relay contacts 12a. A relay coil 12b driving the relay contacts 12a is connected to the battery 13 by way of start contacts (hereinafter, "ST contacts") 14a of an ignition switch 14. When the ignition switch 14 is turned to the position of the ST contacts 14a, the relay contacts 12a are closed by excitation of the relay coil 12b, the motor 11 and the battery 13 are connected, and the engine 1 is cranked by the starter 6. The relay coil 12b of the starter 6 is connected to the battery 13 by way of relay contacts 15a of a starter controller 15 and ON contacts 14b of the ignition switch 14. A relay coil 15b driving the relay contacts 15a is connected to the battery 13, and excitation of the relay coil 15b is controlled by an ECU 21. Thus, even when the ignition switch 14 is in the position of the ON contacts 14b, when the relay contacts 15a are closed by excitation of the relay coil 15b, the motor 11 and the battery 13 are connected and the engine 1 is cranked.

The ECU (Engine Control Unit) 21 is mounted in a passenger compartment and has input-output devices, memory devices (ROM, RAM, BURAM) used to store control programs and control maps and the like, a central processing unit (CPU), timer counters, and so on. To the input side of the ECU 21 are connected an engine temperature sensor 22 detecting an engine temperature T of the engine 1, a crank angle sensor 23 for outputting a crank angle signal along with rotation of the crankshaft of the engine 1, a cam angle sensor 24 for outputting a signal (hereinafter, "TOP signal") in the vicinity of each piston top dead center position along with rotation of a camshaft, a vehicle speed sensor 25 detecting the vehicle speed V, a clutch sensor 26 detecting the operating state of the clutch pedal, an accelerator sensor 27 detecting an accelerator operation level Acc, a shift position sensor 28 detecting a shift position of the transmission 4, and other switches and sensors.

To the output side of the ECU 21 are connected the above-mentioned spark plugs 2 and fuel injection valves 3 and also the relay coil 15b of the starter controller 15. On the basis of the detected information, the ECU 21 executes various programs for running the engine 1 through fuel injection control and ignition timing control and so on.

The ECU 21 also executes automatic stop/start processing for stopping and starting the engine 1 when the vehicle has halted at a traffic signal or the like. Upon starting of the engine, the ECU 21 executes control exclusively for starting, to promote quick starting.

In this direct-injection engine 1, in addition to uniform combustion, wherein fuel is injected during an intake stroke to create a uniform mixture in the combustion chamber, a stratified combustion, wherein fuel is injected during the compression stroke and made to combust at an overall air/fuel ratio of an extremely lean mixture, is possible. The stratified combustion is generally conducted at low-speed, low-load operating regions. At this time, with a target mean effective pressure Pe (manifesting engine load) obtained, for example, from the accelerator operation level Acc, detected by the accelerator sensor 27, and an engine speed Ne, obtained from the crank angle signal detected by the crank angle sensor 23, in a relatively low region, the ECU 21 executes the compression stroke injection to reduce emissions and improve fuel economy. In other regions (for example, high-speed and high-load operating regions), the ECU 21 executes the intake stroke injection to secure the required engine torque.

Next, automatic stop/start processing of the engine 1, peculiar to an idle-stop vehicle, will be briefly explained.

When the traveling vehicle has halted at a traffic signal or the like, the ECU 21 automatically stops the engine 1 on the basis of preset engine stop conditions being established, and similarly starts the engine 2 on the basis of preset engine start conditions being established, and thereby eliminates emissions and fuel consumption while the vehicle is being halted. As the engine stop conditions: the vehicle speed V, detected by the vehicle speed sensor 25, is set to zero; no depression of the clutch pedal is being detected by the clutch sensor 26 (i.e. the clutch is engaged); and the shift position detected by the shift position sensor 28 is an N (neutral) position. When these conditions are satisfied, the ECU 21 recognizes that the engine stop conditions are established and suspends fuel injection control and ignition timing control and thereby stops the engine 1. This recognition of the engine stop conditions and this stop control of the engine 1, respectively, function as stop condition recognizing means and engine automatic stopping means.

The engine start conditions for automatic starting of the engine are, for example: depression of the clutch pedal has been detected by the clutch sensor 26 (the clutch is disengaged) and the shift position detected by the shift position sensor 28 is the N position. When these conditions are satisfied, the ECU 21 recognizes that the engine start conditions are established, excites the relay coil 15b of the starter controller 15, and resumes fuel injection control and ignition timing control. The determination of whether or not these engine start conditions are established (start condition recognizing means) is equivalent to the start request determining means.

Here, the determination by the ECU 21 of whether or not these engine start conditions are established functions as start condition recognizing means. Because the relay contacts 15a are closed by the excitation of the relay coil 15b, the motor 11 of the starter 6 is connected to the battery 13, cranking of the engine 1 is carried out, and the engine 1 is thereby started so that the vehicle can move.

Normal engine starting and stopping is the same as in an ordinary vehicle operated by a driver with ordinary driving skill. First, when the ignition switch 14 is turned by the driver to the position of the ST contacts 14a, the motor 11 of the starter 6 is connected to the battery 13 and cranking of the engine 1 is carried out. Along with this cranking, fuel injection control and ignition timing control are started by the ECU 21, and the engine 1 is thereby started. On the other hand, when, while the engine 1 is running, the ignition switch 14 is turned by the driver from the ON contacts 14b to a position of OFF contacts (not shown), fuel injection control and ignition timing control of the ECU 21 are terminated and the engine 1 stops.

In both the automatic stopping and the manual stopping described above, when the ECU 21 stops the engine 1, it terminates fuel injection control and ignition timing control in accordance with an engine stop routine shown in FIG. 2, as described below.

The ECU 21 executes the engine stop routine synchronous with rotation of the engine 1 every 180° CA, and first, in step S2, determines whether or not the engine is stopped. When the determination is NO (negative), in other words when the engine stop conditions are not established or the ignition switch 14 has not been turned by the driver to the OFF position, an injection command flag Ff is set in step S4, a stop counter C is reset in step S6, a spark command flag Fi is set in step S8, and then the routine is ended. Since the ECU 21 executes fuel injection control and ignition timing control on the basis of this setting of an injection command flag Ff and a spark command flag Fi, running of the engine 1 continues.

When, in step S2, the determination is YES (affirmative), in other words when either the engine stop conditions are established or the ignition switch 14 has been turned to the OFF position by the driver, the injection command flag Ff is reset in step S10 and the stop counter C is incremented in step S12. Then, in step S14, it is determined whether or not the stop counter C has reached three, and when this determination is NO, processing moves to step S8. When the determination in step S14 is YES, processing moves to step S16 and resets the spark command flag Fi and ends the routine.

Thus, after the injection command flag Ff is reset in step S12 and fuel injection control is stopped, two strokes in the operating cycle of the engine 1 pass and the stop counter C reaches three before the spark command flag Fi is reset in step S16, and ignition timing control is stopped. By the processing in step S14, fuel injected in the compression stroke is sparked within one stroke, and fuel injected in the earlier intake stroke also is sparked within two strokes, and consequently even the fuel in the cylinder, into which fuel is injected last when the engine is stopped, is surely sparked and combusts. As a result, trouble caused by liquid fuel remaining in combustion chambers, for example, fouling of the spark plug 2 at the time of restarting or the exhausting of unburned gas, is prevented.

Next, start control executed by the starting device of the direct-injection engine 1 constructed as described above will be described.

Figure 3:
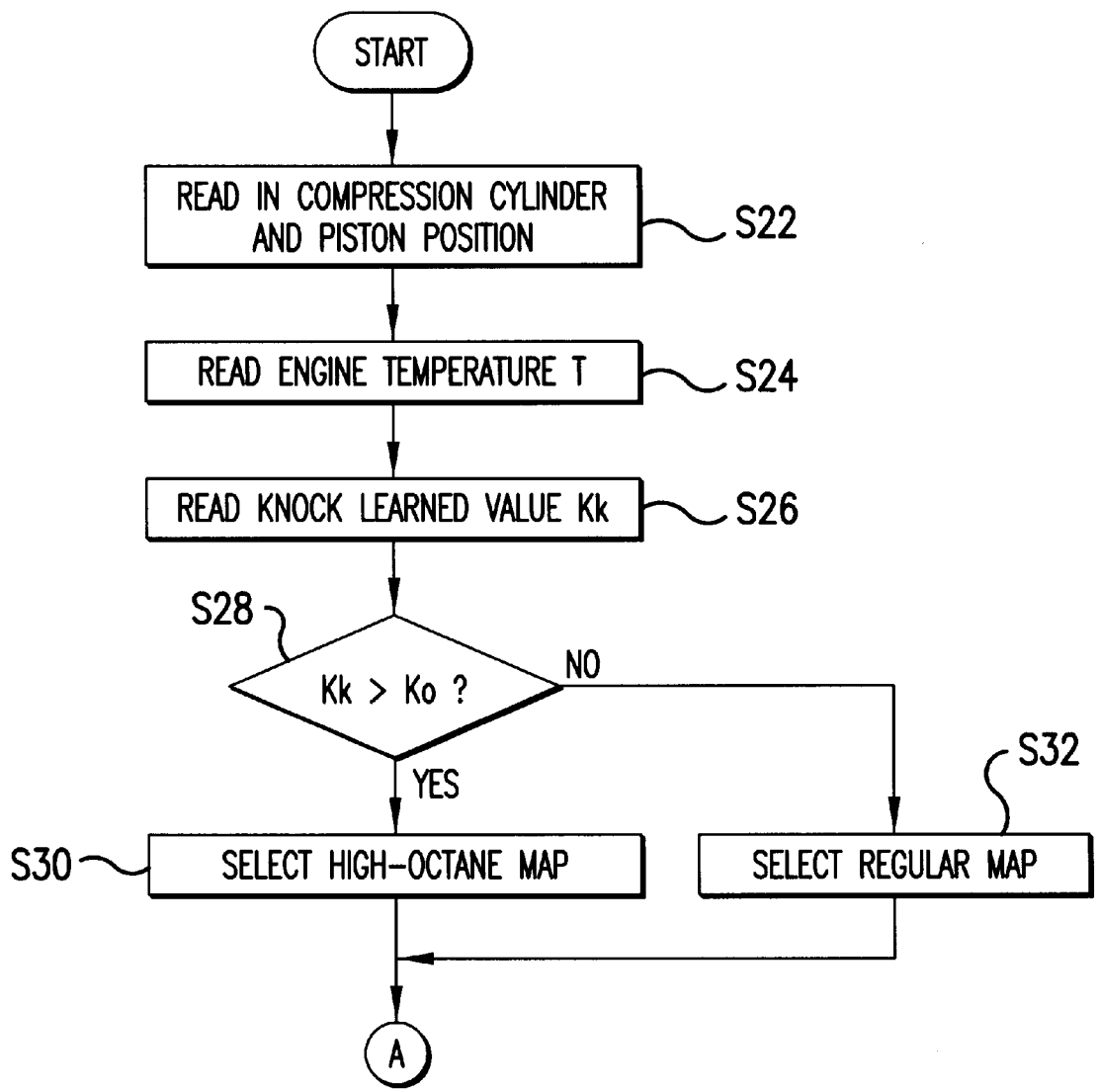
FIG. 3 is a flow chart showing an engine starting routine executed by the ECU of the first preferred embodiment.
Figure 4:
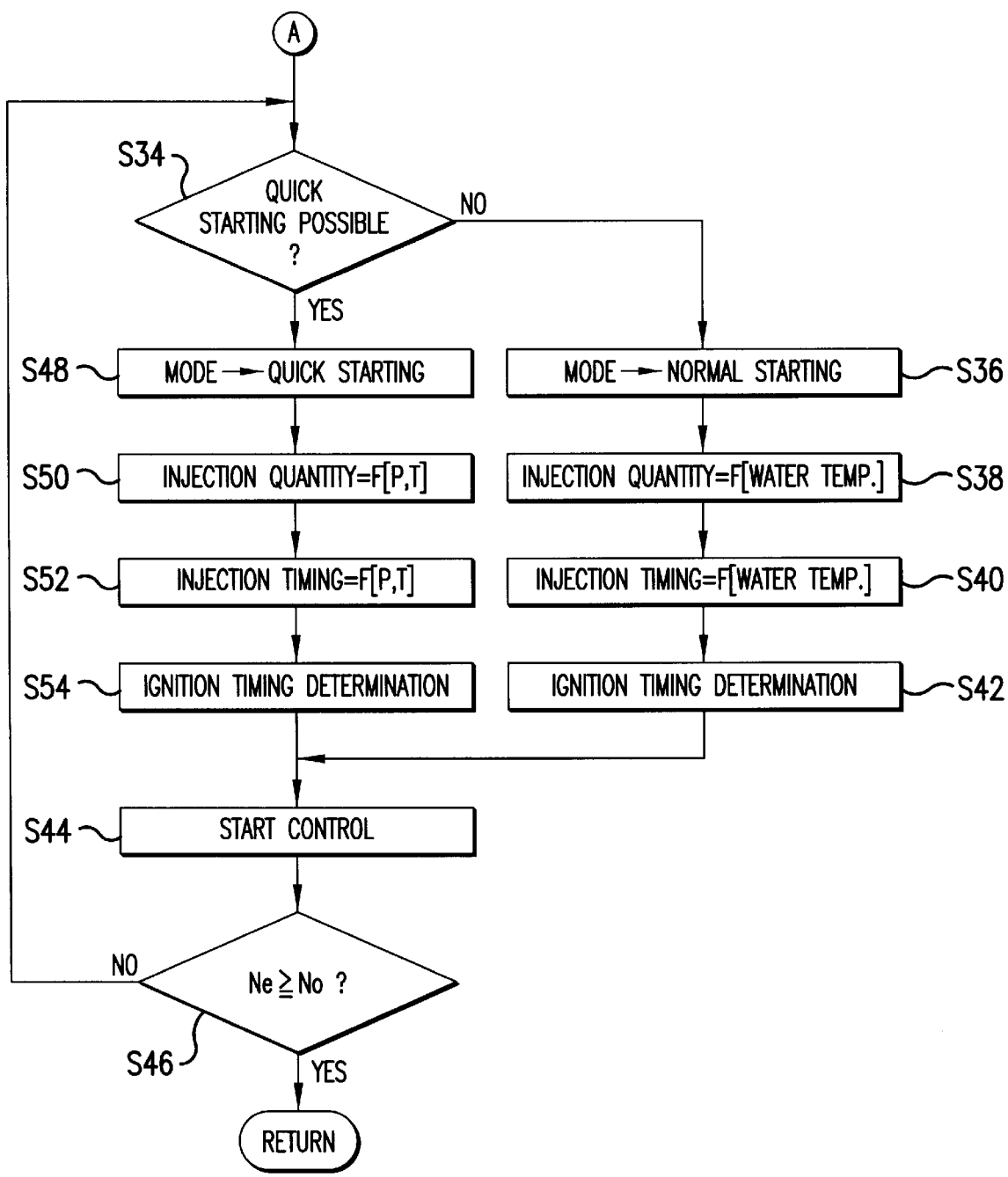
FIG. 4 is a flow chart showing an engine starting routine executed by the ECU of the first preferred embodiment.

When the starting conditions are established during an automatic engine stop at a traffic signal or the like, or when the ignition switch 14 is turned by the driver to the position of the ST contacts 14a, and cranking of the engine 1 is commenced, and the ECU 21 executes an engine start routine shown in FIG. 3 and FIG. 4. First, in step S22, the ECU 21 reads information regarding which cylinder of the stopped engine 1 is in its compression stroke (hereinafter, "the compression stroke cylinder"), and information relating to the piston position P of that cylinder. When the ignition switch 14 has been turned by the driver to the position of the ST contacts 14a, it is determined by the start request determining means that there is an engine start request.

This information is computed from the crank angle signal outputted by the crank angle sensor 23 and the TOP signal outputted by the cam angle sensor 24 immediately before the engine has stopped, and is kept in memory not only during an automatic engine stop, but also when the vehicle has been parked and the ignition switch 14 is turned to the OFF position. In this preferred embodiment, the crank angle sensor 23, the cam angle sensor 24, and the ECU 21, executing the processing in step S22, function as cylinder identifying means.

Here, because in a four-stroke, in-line four-cylinder engine, one of the cylinders is always in its compression stroke, the cylinder in the compression stroke is always specified at this time. Further, the crank angle of this cylinder, in the stopped engine, concentrates around 90° CA BTDC. This is because in the in-line four-cylinder engine of this preferred embodiment, a cylinder reaches compression top dead center every 180° CA, and because even if it stops in the vicinity of compression top dead center it will fall back by the compression reaction.

Next, the ECU 21, in step S24, reads the engine temperature T detected by the engine temperature sensor 22 and, in step S26, reads a knock learned value Kk. The knock learned value Kk is a learned value for setting a basic ignition timing to an optimum value just preceding the onset of knocking. That is, as is known, in knock control, the ignition timing is feedback-controlled to a timing just before the onset of knocking on the basis of a knock retard level set from the output of a knock sensor (not shown). In this connection, a knock learned value Kk is suitably learned on the basis of the knock retard level used at this time, and the basic ignition timing is corrected in advance on the basis of this knock learned value Kk to eliminate feedback control lag. In other words, the knock learned value Kk assumes a value corresponding to the conditions, under which knocking occurs in the engine 1, and because for the same engine, the conditions under which knocking occurs vary in correspondence with the octane level of the gasoline used (Regular or High-Octane), the knock learned value Kk can be thought of as an index showing the octane level of the gasoline used.

Figure 5:
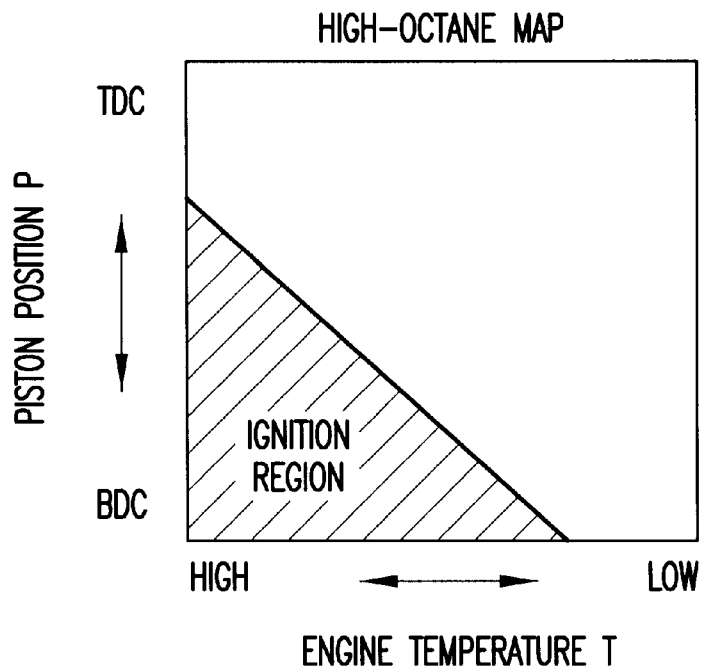
FIG. 5 is a view illustrating a map for use with High-Octane fuel for determining an ignition region in the first preferred embodiment.

Next, in step S28, the ECU 21 determines whether or not the knock learned value Kk is larger than a preset map switch determination value Ko. When the determination is YES, it is inferred that the gasoline in use is High-Octane, and, in step S30, the map for High-Octane use, as shown in FIG. 5, is selected. When, in step S28, the determination is NO, it is inferred that the gasoline in use is Regular, and, in step S32, the map for Regular use, as shown in FIG. 6, is selected.

Then, in accordance with the selected map, it is determined, in step S34 whether or not quick start control can be executed. The quick start control, as will be further discussed below, is processing for effecting a first combustion immediately by injecting fuel into the cylinder in the compression stroke and igniting it. To realize this, a temperature for vaporizing the fuel and a pressure sufficient for its successful ignition are necessary. For example, when the temperature in the cylinders of the engine 1 upon starting is low, or when the piston position P of the compression stroke cylinder is close to top dead center, and very little compression is possible, thus no temperature rise from compression can be expected either, there will be an ignition failure and thus no first combustion will be obtained.

Figure 6:
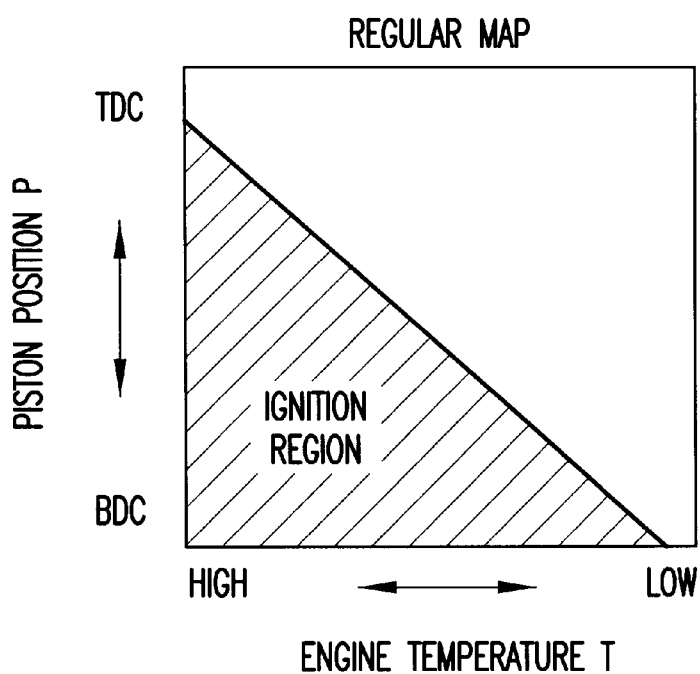
FIG. 6 is a view illustrating a map for use with Regular fuel for determining an ignition region in the first preferred embodiment.

In this connection, in the maps shown in FIG. 5 and FIG. 6, ignition regions are set on the basis of the engine temperature T, which correlates with the temperature in the cylinders, and the piston position P. As is clear from the figures, the higher the engine temperature T, and the closer the piston position P to bottom dead center (hereinafter, "BDC") of the piston stroke, the probability of being in the ignition region is higher and thus the ignition is more certain. As is known, Regular gasoline has the characteristic of igniting more readily than High-Octane gasoline. Consequently, in the map for use with Regular gasoline, the ignition region is larger than in the case of High-Octane gasoline.

The determination of quick start control, in step S34, is carried out on the basis of whether or not the respective values lie in the ignition region of the map. Step S34 functions as ignition region determining means. Here, when the engine 1 has been automatically stopped while the vehicle is halted at a traffic signal or the like, because the temperature of the engine itself is high as a result of it having been running, the temperature in the cylinder is amply high due to heat transmission from the cylinder wall, and since, as mentioned above, there is a high probability of the crank angle being positioned around 90° CA BTDC in the stopped engine, the piston position P is likely to be in the middle part of the piston stroke. Consequently, in most cases, the respective values do lie in the ignition region and the determination in step S34 is YES.

When the determination in step S34 is NO, a starting mode is set to normal start control in step S36, a fuel injection quantity is determined on the basis of the cooling water temperature of the engine 1 in step S38, an injection timing is also determined on the basis of the cooling water temperature in step S40, an ignition timing is set in step S42, and start control is executed on the basis of this information in step S44. At this time, in the case of automatic starting of the engine 1 on the establishment of the engine start conditions during an automatic stop, cranking of the engine 1 is commenced (in the case where starting initiated by the driver, this is not necessary because cranking has already been commenced) and fuel injection and ignition are executed for the cylinder reaching its intake stroke first on cranking.

Then, in step S46, it is determined whether or not the engine speed Ne is above a preset full-firing determination value No. When the determination is NO, it is inferred that starting is not complete and processing returns to step S34, and repeats until the determination in step S46 becomes YES, whereupon the routine ends. Processing then moves to normal engine control, and selects the compression stroke injection or intake stroke injection on the basis of the target mean effective pressure Pe and the engine speed Ne. And for example, when idle running is continued, the compression stroke injection is set, and when a rapid acceleration running is called for in response to an acceleration demand from the driver, the intake stroke injection is set, and control is carried out by a fuel injection quantity, an injection timing, and an ignition timing corresponding to the respective running state being determined.

When the determination in step S34 is YES, the starting mode is set to quick start control in step S48, a fuel injection quantity is determined in step S50, a fuel injection timing is determined in step S52, and an ignition timing is determined in step S54. Then, on the basis of this information, in the above-mentioned step S44, start control is executed with the cylinder in the compression stroke as the object. The fuel injection quantity, the injection timing, and the ignition timing at this time are different from in the case of the normal start control described above, and are determined as follows.

Since the amount of air in the cylinder in the compression stroke varies in accordance with the piston position P and the cylinder temperature, an optimum value for the fuel injection quality is obtained from a map (not shown) set in correspondence with the piston position P and the engine temperature T. Further, an optimum value for the injection timing is similarly obtained from the piston position P and the engine temperature T. In each case a map for use with High-Octane gasoline and a map for use with Regular gasoline are provided, and the map to be applied is selected in the same way as in the map selection carried out by the determination results in step S28. Alternatively, the maps may not be changed in correspondence with the octane level like this, and obtain the fuel injection quantity and injection timing from a common map instead.

Figure 7:
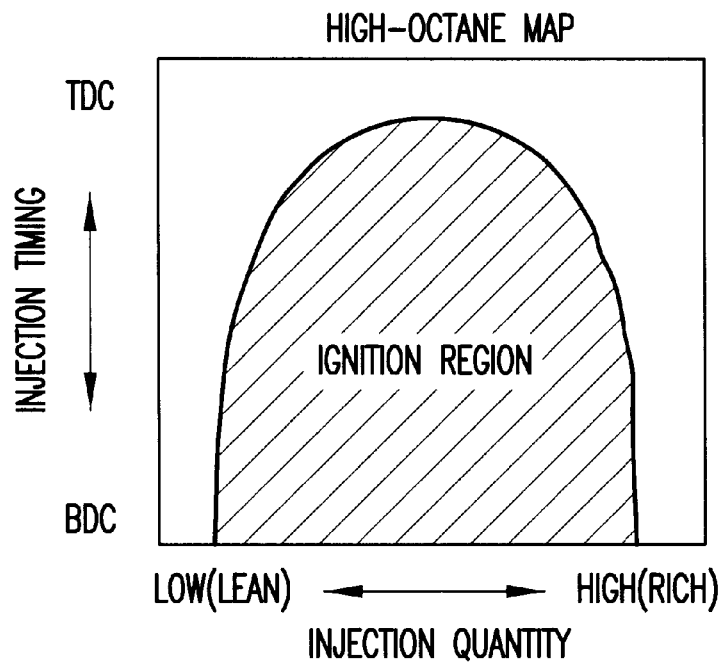
FIG. 7 is a view illustrating effects of an injection quantity and an injection timing on an ignition region of High-Octane fuel in the first preferred embodiment.
Figure 8:
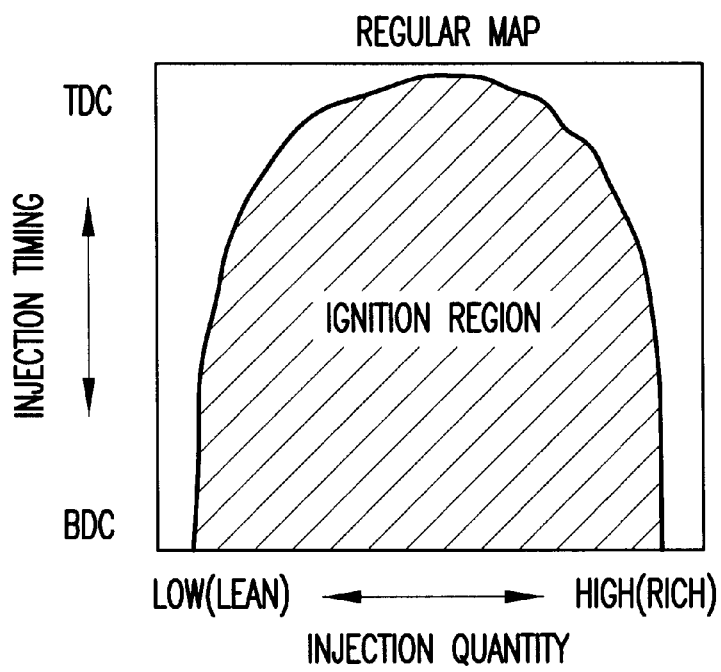
FIG. 8 is a view illustrating effects of injection quantity and injection timing on an ignition region of Regular fuel in the first preferred embodiment.

Here, the relationship between the fuel injection quantity and the injection timing can be expressed as shown in FIG. 7 in the case of High-Octane gasoline, and as shown in FIG. 8 in the case of Regular gasoline. It can be seen that ignition occurs most readily when the fuel injection quantity is at an optimum value (set in correspondence with the amount of air in the cylinder, as mentioned above), and also when the injection timing is that of when the piston position P is close to bottom dead center (BDC). Since ignition is carried out immediately after the commencement of cranking as described above, the ignition timing is set to an optimum value such that the first combustion can be effectively converted into rotation of the engine 1, which is different from the normal starting control.

When the determination in step S46 is YES, this routine is ended and processing moves to the normal engine control. When the determination in step S46 is NO and starting is not complete, the processing in step S34, step S48 through step S54, and step S44 is repeated, and the same control is executed for the cylinder following the cylinder in which the first combustion was obtained as described above. However, because cranking has already commenced and compression takes place from piston bottom dead center at this time, the piston position P is set to bottom dead center. Further, because air having been residing in and warmed by the intake passages of the engine 1 is taken into this cylinder, as with the first compression stroke cylinder, a considerably high cylinder temperature is obtained. Therefore, for this following cylinder, it is also highly likely that the determination in step S34 will be YES, in which case quick start control is executed and rotation of the engine 1 is accelerated by this combustion.

Even if starting is not completed by the combustion in this following cylinder (and the determination in step S46 is NO), quick start control is also executed with a high cylinder temperature for the cylinder after that because intake air sufficient for several cylinders reside in the intake passages of the engine 1, and in most cases, starting will be complete within a few strokes. When starting still does not complete, the determination in step S34 becomes NO due to the falling temperature in the cylinders, processing automatically switches to the normal start control of step S36 onward, and starting continues to be attempted. In this preferred embodiment, the ECU 21 executing the processing in step S44 and step S48 through step S54 functions as start control means.

Figure 9:
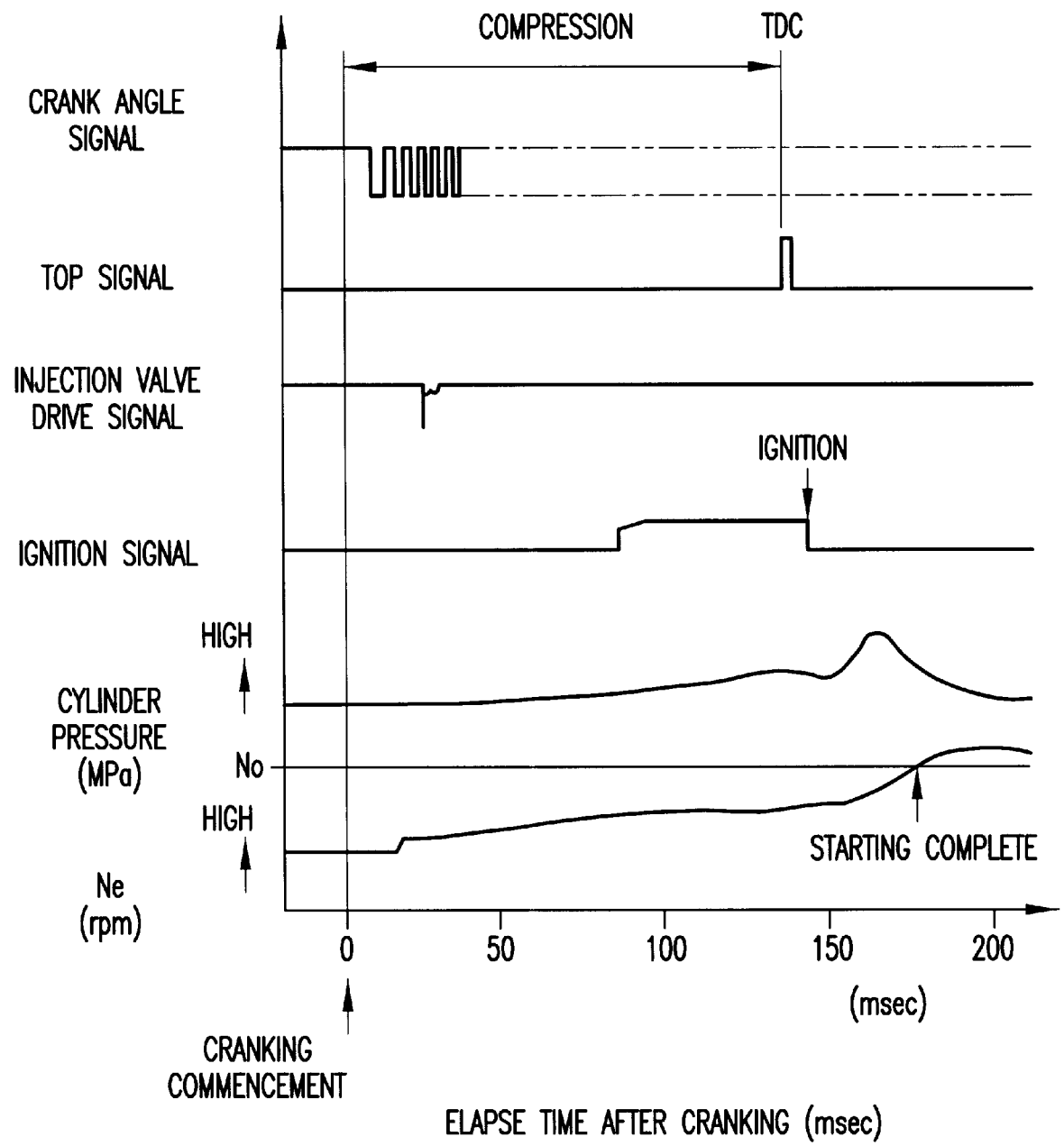
FIG. 9 is a timing chart illustrating an execution of quick start control of the first preferred embodiment.

Next, an execution of the quick start control, described above, will be explained with reference to the time chart of FIG. 9.

When a cranking is commenced at the time when the compression stroke is positioned at a certain crank angle, fuel injection is carried out immediately thereafter and ignition is carried out immediately after compression top dead center is passed. When ignition is successful and a first combustion takes place, the engine speed Ne rises as the pressure in the cylinder increases, and when its value reaches the full-firing determination value No, the determination that starting is complete is made. In this case, starting can be completed in about 65° CA from the commencement of cranking and in an extremely short period of time of about 140 msec. When starting is not completed by this first combustion, the same start processing is executed with respect to the next cylinder, but even in this case, starting can be completed within about twice or three times the above period of time.

As will be clear from the foregoing description, in the starting device of the engine 1 of this first preferred embodiment, starting can be carried out swiftly because fuel injection and ignition are executed immediately with the cylinder in the compression stroke of the stopped engine as the object, thus a first combustion can be effected. That is, as compared to a conventional case where a cylinder identification is carried out when cranking is commenced and fuel injection and ignition are started only when one of the cylinders reaches its intake stroke or its compression stroke after that cylinder identification is completed, the time required for starting can be greatly shortened. Therefore, not only in the case where starting is initiated by the driver, but also when the vehicle is being halted at a traffic signal or the like, the engine start conditions are established and the engine 1, having been automatically stopped, is automatically restarted. Therefore, starting can be completed and the vehicle can move almost instantaneously, and hence the product value of an idle-stop vehicle can be improved.

Furthermore, because a map (FIG. 5 and FIG. 6) is selected in correspondence with the octane value of the gasoline being used, and determination of an ignition region, determination of a fuel injection quantity, and an injection timing are carried out in accordance with that map, the number of opportunities for quick start control is maximized with respect to the octane level of the gasoline used and the fuel injection quantity, and injection timing in quick start control can be optimized to obtain a first combustion surely. As a result, it is possible for the advantages of the quick start control to be exploited to the utmost.

Now, as mentioned above, the stopping characteristics of the engine 1 are such that there is a high probability of the piston position P in the cylinder in the compression stroke being held to a low position, favorable to the execution of quick start control; however, very occasionally the piston of the cylinder in the compression stroke may, for some reason, stop in an unfavorable piston position P close to compression top dead center. To overcome this, processing for using the permanently-meshing starter 6 to correct the piston position P to a favorable position may be added. Since this correction processing will lead to a delay in starting if carried out after the commencement of cranking, it should be implemented upon stopping of the engine.

Figure 2:
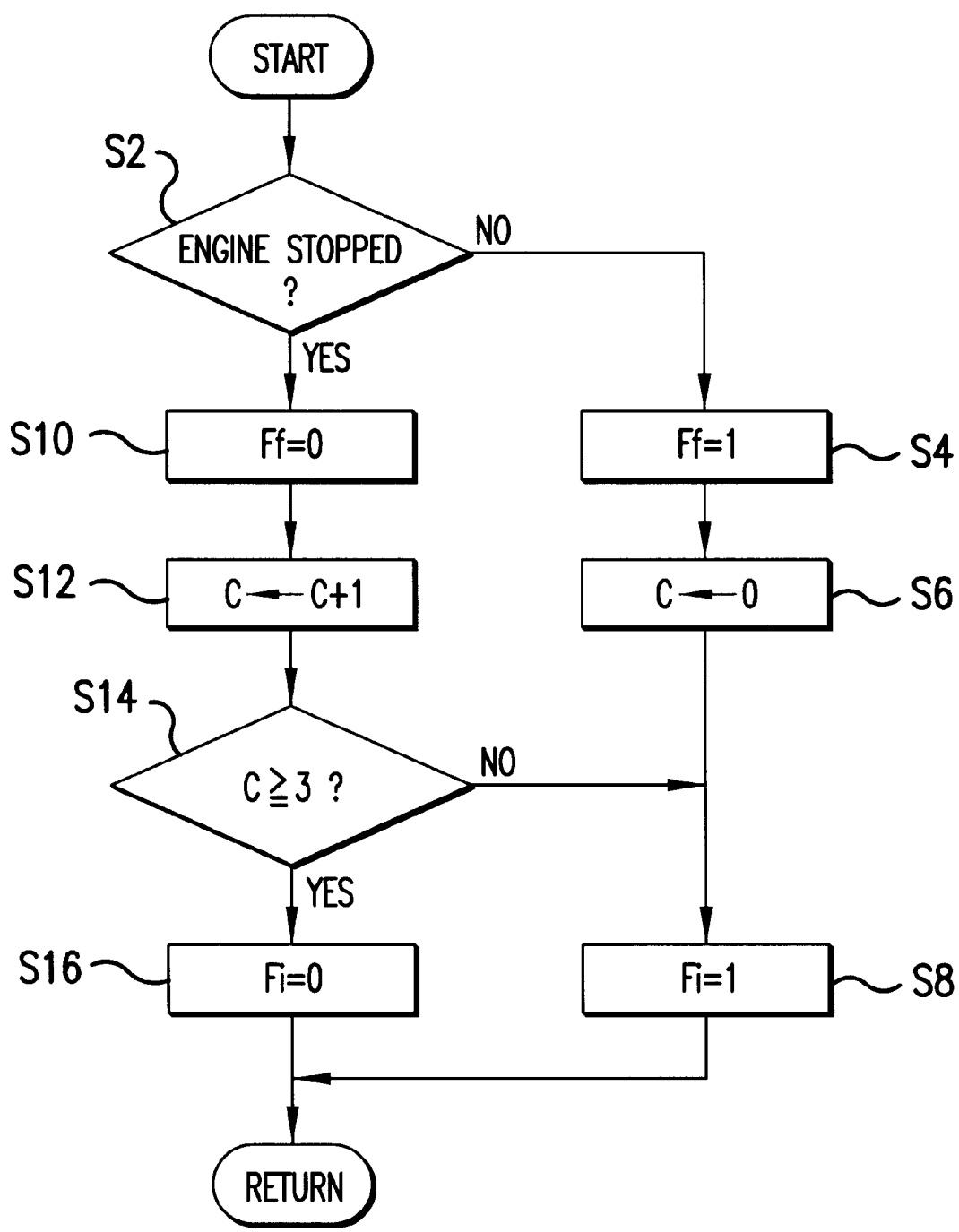
FIG. 2 is a flow chart showing an engine stopping routine executed by an Engine Control Unit (hereinafter, "ECU") of the first preferred embodiment.

For example, when the piston position P is too high when the engine 1 is stopped by the engine stopping routine of FIG. 2, the starter 6 is operated to move the crank angle to an optimum piston position P. As the piston position P at this time, the vicinity of bottom dead center, for example, where a full combustion is possible even if the cylinder temperature is low, is set. This control for moving the piston position P is equivalent to piston position correcting means.

Because the drive direction of the starter 6 is limited to a forward rotation, the engine 1 is moved in the forward direction of the crank angle to make the next cylinder in the compression stroke. When this is done, since cranking can always be commenced from an optimum piston position P, even at lower cylinder temperatures, it is determined that the respective values lie in the ignition region, and thus the number of opportunities for quick start control can be greatly increased.

In the foregoing description of the first preferred embodiment, quick start control was executed after it was determined whether or not conditions in the cylinder in the compression stroke lie in an ignition region on the basis of the engine temperature T and the piston position P; however, it is not always necessary for this determination to be carried out, and for example, quick start control may be executed with respect to the cylinder in the compression stroke unconditionally and then switched to normal start control thereafter if the engine fails to start.

Next, a second preferred embodiment of the present invention, applied to a starting device for a direct-injection internal combustion engine used in an idle-stop vehicle, will be described.

The overall construction of this second preferred embodiment is the same as the overall construction of the first preferred embodiment, and therefore will not be described again here. Also, the automatic stop processing, the engine stop conditions, and the engine start conditions of the engine 1, peculiar to an idle-stop vehicle, are the same as in the first preferred embodiment and therefore will not be described again here.

Now, start control executed by a starting device for a direct-injection internal combustion engine 1 pertaining to the second preferred embodiment will be described.

Figure 10:
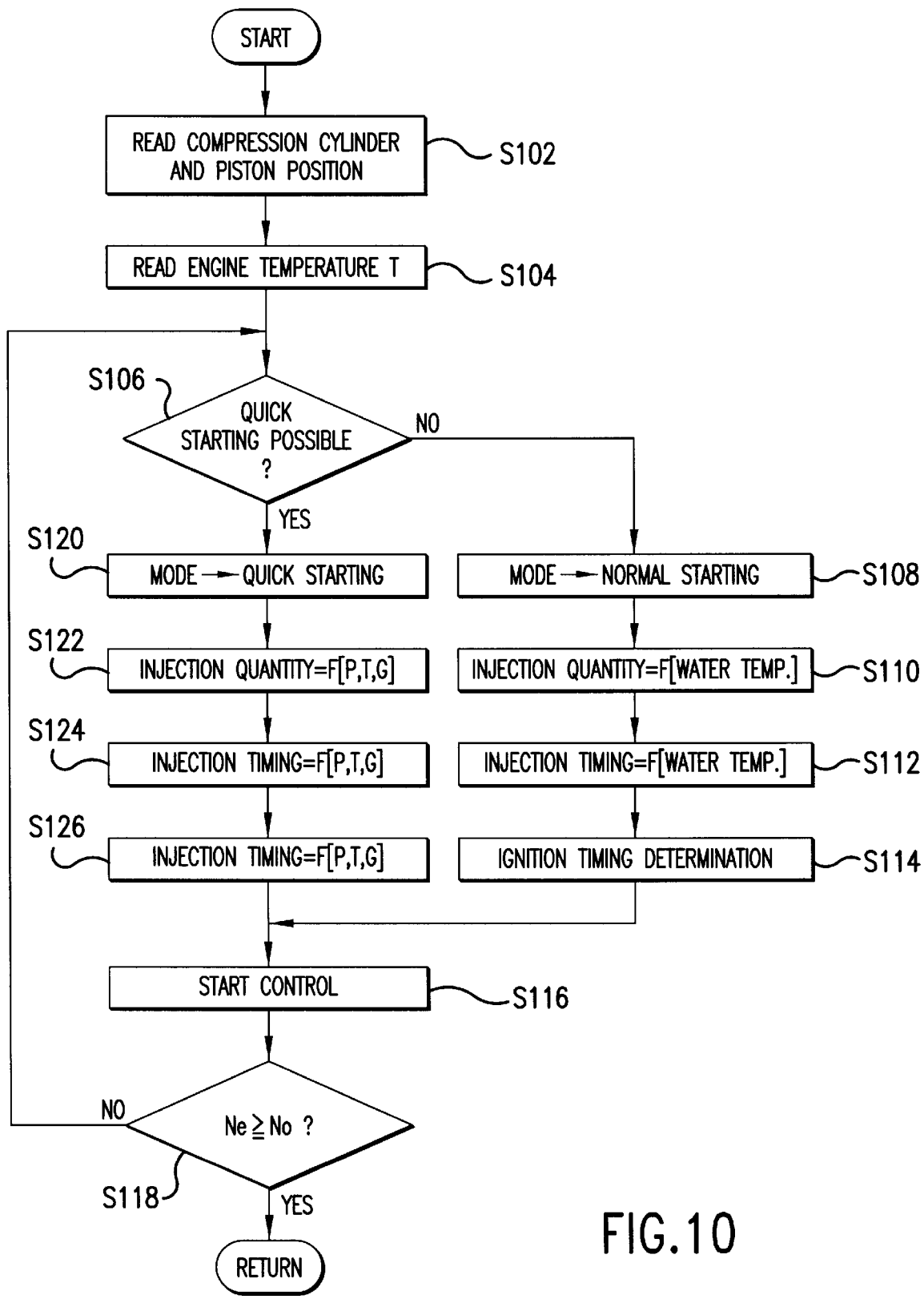
FIG. 10 is a flow chart showing an engine starting routine executed by an ECU of a second preferred embodiment of the invention.

When the starting conditions are established during an automatic engine stop at a traffic signal or the like, or when the ignition switch 14 is turned by the driver to the position of the ST contacts 14a, and cranking of the engine 1 is commenced, the ECU 21 executes an engine start routine shown in FIG. 10. First, in step S102, the ECU 21 reads information on which cylinder of the stopped engine 1 is in its compression stroke (hereinafter, "the compression stroke cylinder") and information relating to the piston position P of that cylinder. Because in a four-stroke, in-line four-cylinder engine one of the cylinders is always in its compression stroke, a compression stroke cylinder is always specified at this time, and since the piston experiences a compression reaction at compression top dead center, there is a high probability of the piston position P being concentrating around 90° CA BTDC.

This information on the compression stroke cylinder and its piston position P is computed from the crank angle signal outputted by the crank angle sensor 23 and the TOP signal outputted by the cam angle sensor 24 immediately before the engine is stopped, and it is kept in a memory not only during an automatic engine stop, but also when the vehicle has been parked and the ignition switch 14 is turned to the OFF position. In this second preferred embodiment, the crank angle sensor 23, the cam angle sensor 24, and the ECU 21 executing the processing in step S102 function as piston position detecting means.

Then, in step S104, the ECU 21 reads the engine temperature T, detected by the engine temperature sensor 22, and, in step S106, determines whether or not it is possible to execute quick start control with respect to the current compression stroke cylinder. As will be discussed below, quick start control is processing for effecting a first combustion immediately by injecting fuel into the compression stroke cylinder and igniting it. To realize this, a temperature for vaporizing the fuel and a pressure sufficient for its successful ignition are necessary. For example, when the temperature of gas remaining in the compression stroke cylinder is low or the piston position P is close to top dead center, and no substantial compression is possible, there will be an ignition failure and thus no first combustion will be obtained.

Figure 11:
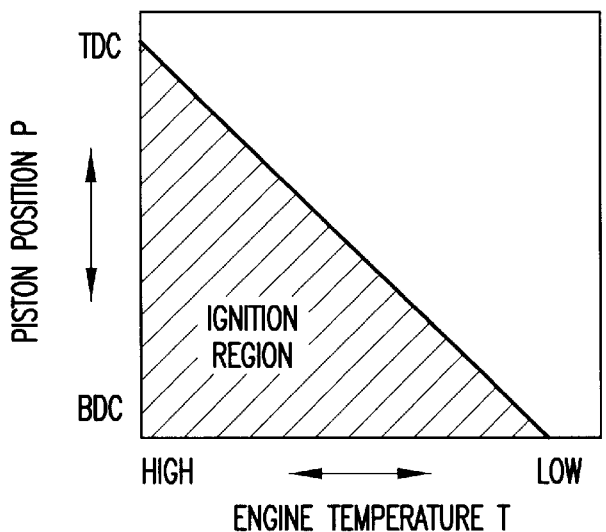
FIG. 11 is a view illustrating a map for determining an ignition region in the second preferred embodiment.

In this connection, in step S106, it is determined, for example, in accordance with the map shown in FIG. 11, whether or not the engine temperature T, which correlates with the temperature in the cylinders, and the piston position P lie within an ignition region. This step S106 functions as ignition region determining means. Alternatively, since, even under the same conditions, ignitability varies in correspondence with the octane level of the gasoline used, maps having different characteristics corresponding to different gasoline may be used.

Here, when the engine 1 has been automatically stopped while the vehicle is halted at a traffic signal or the like, because the temperature of the engine itself is high as a result of it having been running, the temperature in the cylinder is amply high due to heat transmission from the cylinder wall, and since, as mentioned above, there is a high probability of the piston position P concentrating around 90° CA BTDC in the stopped engine, in most cases the respective values do lie in the ignition region and the determination in step S106 is YES. The step S106 has a function of an ignition region determining means.

When the determination in step S106 is NO, a starting mode is set to normal start control in step S108, wherein fuel injection is carried out in the intake stroke as in an ordinary engine, a fuel injection quantity is determined on the basis of the cooling water temperature of the engine 1 in step S110, an injection timing is also determined on the basis of the cooling water temperature in step S112, an ignition timing is set in step S114, and start control is executed on the basis of this information in step S116. At this time, in the case of automatic starting of the engine 1 upon the establishment of the engine start conditions during an automatic stop, cranking of the engine 1 is commenced (in the case of starting initiated by the driver this is not necessary, because cranking has already been commenced), and fuel injection and ignition are executed for the cylinder reaching its intake stroke first on cranking.

Then, in step S118, it is determined whether or not the engine speed Ne is above a preset full-firing determination value No, and when the determination is NO, it is inferred that starting is not complete and processing returns to step S106 and repeats until the determination in step S118 is YES, whereupon the routine ends. Processing then moves to the normal engine control, and selects compression stroke injection or intake stroke injection on the basis of the target mean effective pressure Pe and the engine speed Ne. For example, when idle running is continued, compression stroke injection is set, and when a rapid acceleration running is called for, in response to an acceleration demand from the driver, intake stroke injection is set. Control is carried out by determining a fuel injection quantity, an injection timing, and an ignition timing corresponding to the respective running state.

When the determination in step S106 is YES, the starting mode is set to quick start control in step S120, and in steps S122, S124, and S126, a fuel injection quantity, a fuel injection timing, and an ignition timing are determined, respectively. Then, on the basis of this information, in the above-mentioned step S116, start control is executed with the compression stroke cylinder as the object. The fuel injection quantity, the injection timing, and the ignition timing at this time are different from those in the case of the normal start control described above, and are determined as follows.

First, the determination of the fuel injection quantity and the injection timing will be discussed. Now, even with the premise that the engine temperature T and the piston position P lie within the ignition region as described above, when, due to compression pressure, a precursor reaction of the injected fuel progresses and the fuel self-ignites before it is ignited by the spark plug 2, not only is an effective torque not produced, but also engine vibration and knocking may result. FIG. 12 through FIG. 15 are characteristic charts showing combustion states of a compression stroke cylinder of when the engine is started from different piston positions P (180° CA BTDC, 120° CA BTDC, 90° CA BTDC, 60° CA BTDC). As it is clear from a comparison of these figures, the tendency toward self-ignition becomes more marked as the piston position P is closer to bottom dead center (180° CA BTDC). This is because, due, for example, to the pressure rise upon compression becoming larger and the time to ignite becoming longer, conditions conducive to progressing of a precursor reaction prevail.

Figure 12:
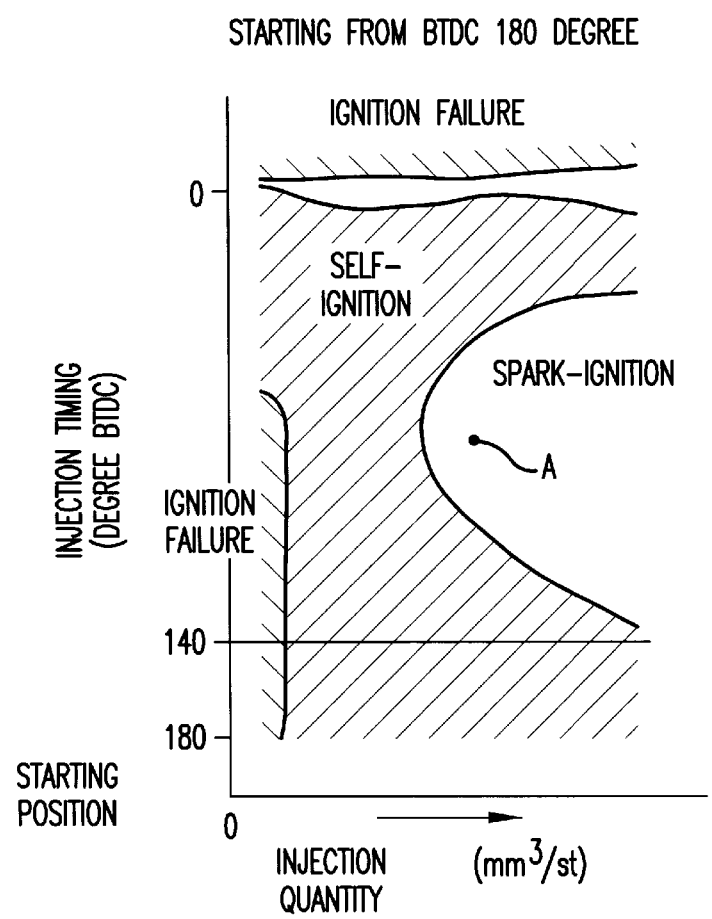
FIG. 12 is a characteristic chart showing a combustion state of a compression stroke cylinder of when the piston position is 180° CA (Crank Angle) before top dead center (hereinafter, "BTDC") on starting in the second preferred embodiment.
Figure 13:
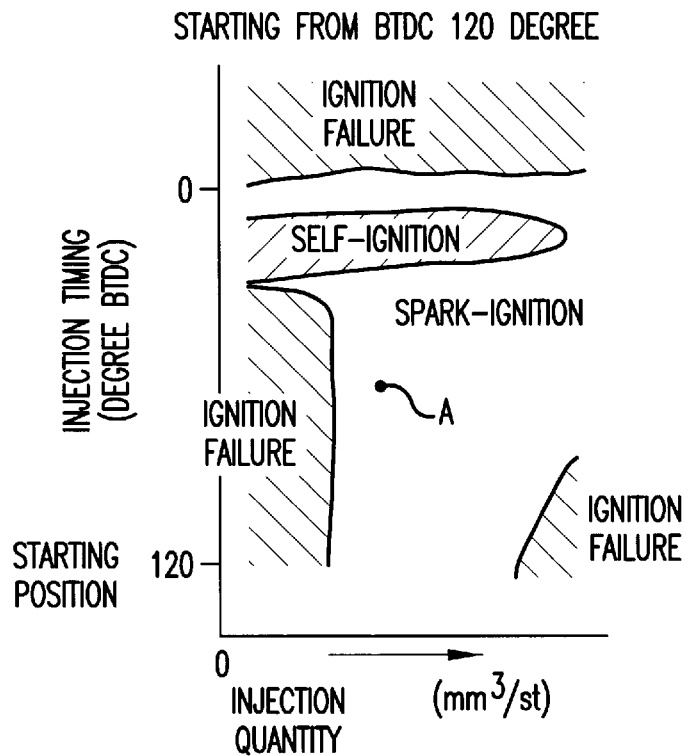
FIG. 13 is a characteristic chart showing a combustion state of a compression stroke cylinder of when the piston position is 120° CA BTDC on starting in the second preferred embodiment.

For the fuel injection quantity, as is clear for example shown in FIG. 12, relatively increasing this quantity to obtain fuel-cooling, makes it easier to effect normal spark-ignition. For the injection timing, as is clear from FIG. 12 through FIG. 15, the optimum injection timing varies depending on the piston position P. Because these characteristics vary from engine to engine, the maps are preset in correspondence with engine type.

Accordingly, when starting from the piston positions P as mentioned above (180° CA BTDC, 120° CA BTDC, 90° CA BTDC, 60° CA BTDC), the fuel injection quantity and the injection timing are set, for example, to point A in the spark-ignition region shown in the respective figure. However, as a condition on the point A relating to the injection timing, it is necessary for the injection timing to be kept to a later angle than the timing (for example, 140° CA BTDC), at which the intake valve is closed, as shown in FIG. 12. This would be the same even if the spark-ignition region is extended to an earlier angle than the valve-closure timing. This condition on the injection timing arises from the fact that substantial compression starts when the intake valve is closed, and the fact that a problem of injected fuel flowing back into the intake passage occurs when fuel is injected before the intake valve is closed.

Figure 14:
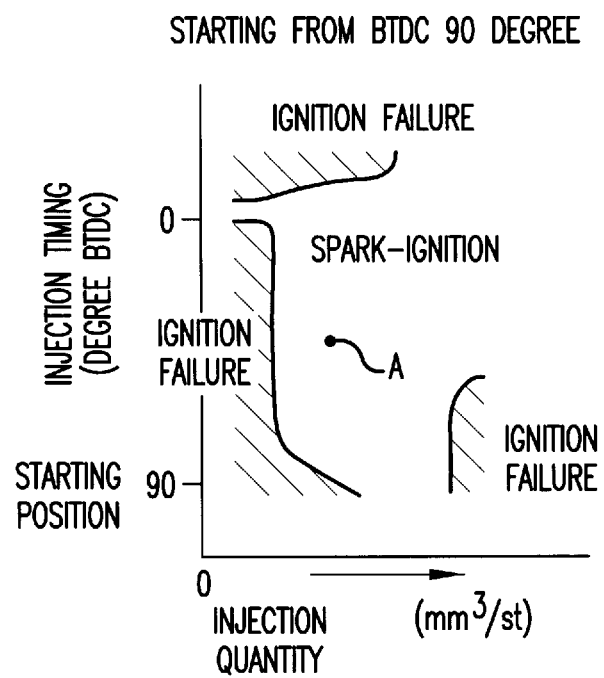
FIG. 14 is a characteristic chart showing a combustion state of a compression stroke cylinder of when the piston position is 90° CA BTDC on starting in the second preferred embodiment.
Figure 15:
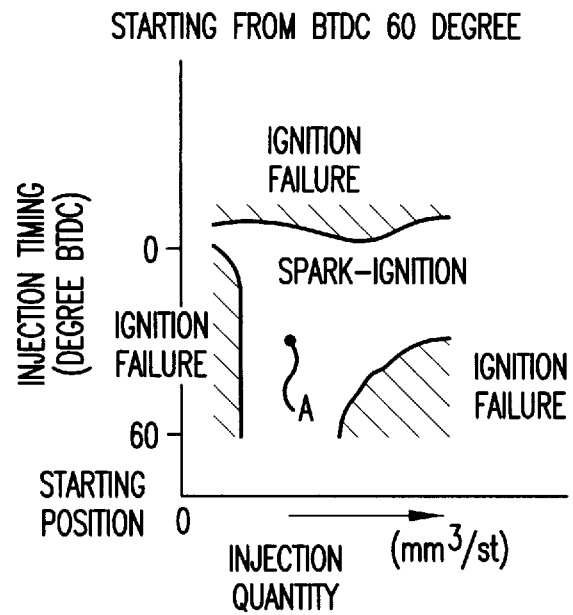
FIG. 15 is a characteristic chart showing a combustion state of a compression stroke cylinder of when the piston position is 60° CA BTDC on starting in the second preferred embodiment.

Because, as mentioned above, the piston position P concentrates around 90° CA BTDC, starting frequently commences from the piston position P of 90° CA BTDC shown in FIG. 14, and conversely the piston position P of 180° CA BTDC of FIG. 12, in which the preceding cylinder is at top dead center and under a compression reaction, hardly ever arises.

On the other hand, because, for the same piston position P, the higher the engine temperature T is, the more readily self-ignition occurs, the characteristics of FIG. 12 through FIG. 15 vary with the engine temperature T. Accordingly, for example, when the engine temperature T is high, it is necessary for this to be adjusted by shifting the point A in fuel injection quantity, to the increase side and shifting, in injection timing, in a direction corresponding with the characteristics of the engine.

Similarly, because, for the same piston position P, the lower the octane level of the gasoline used is, the more readily self-ignition occurs, the characteristics shown in FIG. 12 through FIG. 15 vary with the gasoline used. Accordingly, for example, when Regular gasoline, which self-ignites readily, is used, it is necessary for this to be adjusted by shifting the point A, in fuel injection quantity, to the increase side and shifting, in injection timing, to the later side.

Thus, it is necessary for the fuel injection quantity and the injection timing to be determined in correspondence with the piston position P, the engine temperature T, and the gasoline used G, and, in step S122 and step S124, the fuel injection quantity and the injection timing are determined from maps set on the basis of these characteristics (for example the characteristics of FIG. 12 through FIG. 15). It may not always be necessary for all three of these factors to be taken into account, and, for example, setting corresponding to the gasoline used G may be omitted.

Figure 16:
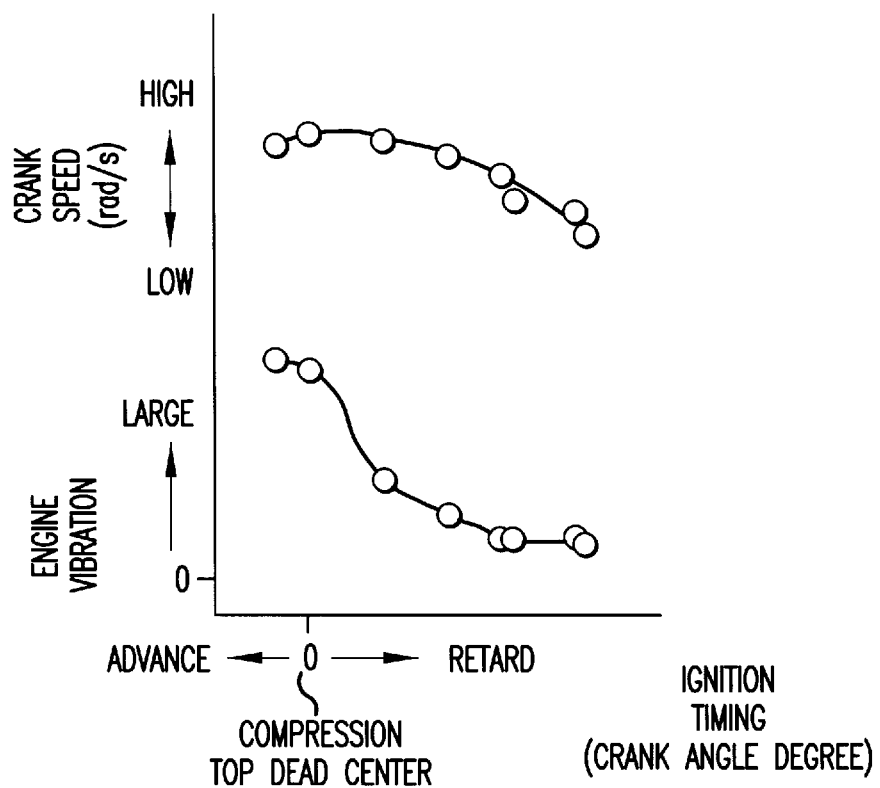
FIG. 16 is a view illustrating an effect of ignition timing on crank speed and engine vibration in the second preferred embodiment.

As for the ignition timing, FIG. 16 shows the effect of ignition timing on crank speed and engine vibration, and it can be seen from this figure that on the later side of compression top dead center engine, vibration is sharply suppressed, a relatively high crank speed is obtained, and combustion pressure is efficiently converted into rotation of the crank shaft. For example, the ignition timing is fixed within a range of about 0° to 15° CA after top dead center (hereinafter, "ATDC"), and maps associated with the above-mentioned three factors (the piston position P, the engine temperature T, and the gasoline used G) are prepared. In step S126, under conditions liable to result in rapid combustion (because the piston position P is close to bottom dead center of the piston stroke and with a normal ignition timing the cylinder pressure would become high), the ignition timing is retarded toward 15° CA ATDC, by which time the cylinder pressure has fallen. Conversely, the more that conditions are not liable to result in rapid combustion (because the piston position P is close to top dead center of the piston stroke and even with a normal ignition timing the cylinder pressure would not become that high), the nearer the ignition timing is set to 0° CA ATDC. For a cylinder, wherein the piston position P is close to bottom dead center of the piston stroke or in its intake stroke upon starting, the ignition timing is preferably set to the ATDC side.

On the basis of this information, start control is executed for the compression stroke cylinder (the first compression stroke cylinder) in step S116, and when the determination in step S118 is YES, this routine is ended and processing moves to the normal engine control. Immediately after processing moves from start control to the normal control, irrespective of the running state, compression stroke injection is temporarily set to prevent wasteful racing of the engine.

When the determination in step S118 is NO and starting has not completed, by the processing in step S122 through step S126 via step S106 and step S120, the same control is executed for the second cylinder. That is, the cylinder which follows the compression stroke cylinder wherein a first combustion was effected, as described above, and was in its intake stroke while the engine was stopped (hereinafter, called "the intake stroke cylinder"; this intake stroke cylinder is the cylinder which enters its compression stroke immediately after the first compression stroke cylinder and can alternatively be called the second compression stroke cylinder). However, for this intake stroke cylinder, because, compared to the compression stroke cylinder, the following points are different, the fuel injection quantity, the injection timing, and the ignition timing are determined in accordance with maps set taking into account these points of difference.

Whereas, in the compression stroke cylinder, compression begins from part-way through the compression stroke, in the intake stroke cylinder, compression always begins from bottom dead center. Consequently, the phenomenon of the self-ignition region changing due to changes in compression state corresponding to the piston position P as in the compression stroke cylinder does not occur, and in that sense, it is not necessary for the piston position P to be considered in the setting of the fuel injection quantity and the injection timing. However, because the intake stroke cylinder, while the engine is stopped, is part-way through the intake stroke, combustion is conducted with low-temperature gas from the intake port mixed with residual gas already present in the cylinder. The cylinder gas temperature, after this mixing, changes with the amount of residual gas from when the engine stopped, or in other words the piston position P of the intake stroke cylinder, and along with that the liability to self-ignition and rapid combustion changes.

Figure 17:
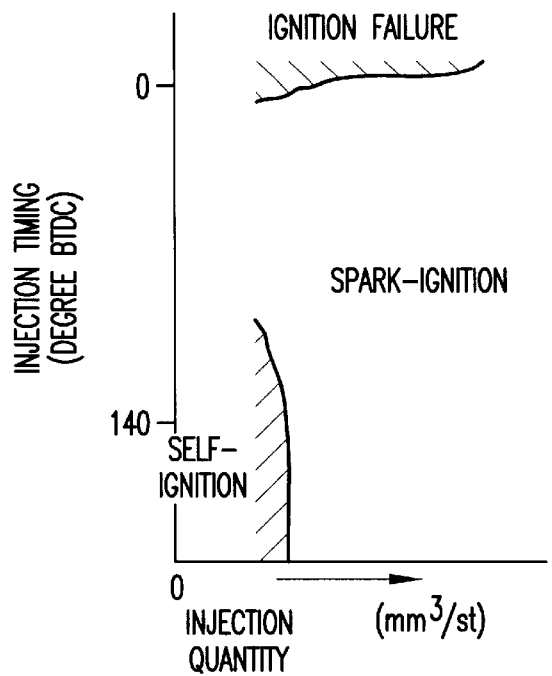
FIG. 17 is a characteristic chart showing a combustion state of an intake stroke cylinder of when the piston position of a compression stroke cylinder is 180° CA BTDC on starting in the second preferred embodiment.
Figure 18:
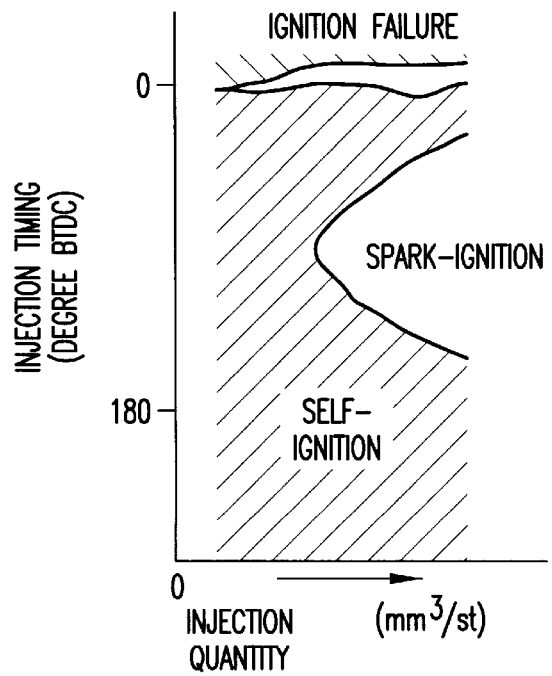
FIG. 18 is a characteristic chart showing a combustion state of an intake stroke cylinder of when the piston position of a compression stroke cylinder is 90° CA BTDC on starting in the second preferred embodiment.

FIG. 17 and FIG. 18 are characteristic charts showing combustion states of the intake stroke cylinder starting from different piston positions P (compression stroke cylinder at 180° CA BTDC, 90° CA BTDC). When, as shown in FIG. 17, the piston position P of the intake stroke cylinder is top dead center, the proportion of residual gas is 0% and that of new intake air is 100%. As a result, the cylinder gas temperature is low and self-ignition and rapid combustion do not occur. As the piston position P of the intake stroke cylinder approaches bottom dead center, the proportion of residual gas increases and that of new intake air decreases, and consequently, the cylinder gas temperature rises and self-ignition and rapid combustion become more liable to occur. For example, when the piston position P of the intake stroke cylinder is about mid-way through the intake stroke, as shown in FIG. 18, due to increased cylinder gas temperature, the self-ignition region occupies most of the chart.

That is, because, in this intake stroke cylinder, the cylinder gas temperature undergoes an influence of the piston position P and does not simply correlate with the engine temperature T, it is necessary to take into account the piston position P to reflect the cylinder gas temperature in the fuel injection quantity and the injection timing. Therefore, in step S122 and step S124, the fuel injection quantity, the injection timing, and the ignition timing are determined from maps (naturally having different characteristics from the compression stroke cylinder) set on the basis of the piston position P (for example the characteristics shown in FIG. 17 and FIG. 18), the engine temperature T, and the gasoline used G.

When the intake stroke cylinder reaches its compression stroke, start control is executed in step S116 on the basis of this information. In most cases, starting is completed by the combustion of the compression stroke cylinder and the intake stroke cylinder, as described above, and the ECU 21 makes a YES determination in step S118 and ends the routine. When starting is still not completed, processing returns to step S106, but as long as the quick starting conditions are satisfied in step S106, quick start control is executed for the third and fourth cylinders by the processing in step S120 onward and starting continues to be attempted. In these cylinders, because the proportion of new intake air becomes 100% and also the engine speed Ne has already risen to some extent, the probability of self-ignition is low. In the second preferred embodiment, the ECU 21 executing the processing in step S122 through step S126 functions as combustion parameter setting means.

As will be clear from the foregoing description, in the starting device of the engine 1 of this second preferred embodiment, because fuel injection and ignition are carried out immediately with the compression stroke cylinder and the intake stroke cylinder of the stopped engine 1 as objects, a first combustion can be effected quickly and the engine started swiftly. Therefore, not only in the case of starting initiated by the driver, but also when, at a traffic signal or the like, the engine start conditions are established and the engine 1 is automatically restarted, starting can be completed almost instantaneously, and hence the product value of an idle-stop vehicle can be improved.

Furthermore, as described above, on the basis of the piston position P, the engine temperature T, and the gasoline used G, which correlate with the likelihood of self-ignition, the fuel injection quantity is set higher and the ignition timing is more retarded as conditions are more likely to initiate self-ignition, and the injection timing is set using a map specific to that engine. Consequently, normal spark-ignition can be effected surely to start the engine 1, and it is possible to prevent, for example, an increase in engine vibration, the occurrence of knocking, or carbon getting into the injection holes of the fuel injection valves 3.

In the foregoing description of the second preferred embodiment, quick start control was executed after it was determined whether or not conditions in the compression stroke cylinder lay in an ignition region on the basis of the engine temperature T and the piston position P; however, it is not always necessary for this determination to be carried out. For example, quick start control may be executed with respect to the compression stroke cylinder and the intake stroke cylinder unconditionally and then switched to the normal start control thereafter if the engine fails to start.

Although, in this second preferred embodiment, quick start control was executed with respect to both the compression stroke cylinder and the intake stroke cylinder, alternatively quick start control may be executed with respect to the intake stroke cylinder without any start control at all being executed with respect to the compression stroke cylinder. When the result of the execution in step S106 is that the determination in step S106 is NO, in step S108, instead of normal start control, wherein fuel is injected in the intake stroke as in an ordinary engine, the following control may be carried out. That is, when, in the ignition region determination, the engine temperature T condition is satisfied and only the piston position P condition is not satisfied, by quick start control being carried out with respect to the following intake stroke cylinder (the second compression stroke cylinder), it is possible for starting to be completed almost instantaneously.

The description of the preferred embodiments of the present invention ends here; however, the invention is not limited to these preferred embodiments. For example, although in the preferred embodiments, as described above, the invention is applied to a starting device for a direct-injection engine 1 for use in an idle-stop vehicle, it may also be applied to a starting device for a direct-injection engine for use in an ordinary vehicle or to a starting device for a direct-injection engine for use in a hybrid vehicle. In this case, in an ordinary vehicle, it is possible to improve startability and, in a hybrid vehicle, it is possible, in addition to that, to start the engine swiftly, for example, at times of acceleration and thereby realizing a good acceleration response.

Although, in the preferred embodiments described above, the invention was applied to an in-line four-cylinder direct-injection gasoline engine 1, the cylinder layout is not limited to this; and because if there are four or more cylinders, there is always a cylinder positioned in its compression stroke when the engine is stopped. If quick start control is executed for that cylinder, it is possible to achieve the same effects as in the preferred embodiments. In an engine such as a V-8, wherein two cylinders are positioned in their compression strokes in the stopped engine, quick start control should be executed with respect to the cylinder with the lower piston position P. In a three-cylinder engine, it is possible that there is a stopped state wherein no cylinder is positioned in its compression stroke; in this case, normal start control should be executed when that happens, and either quick start control should be executed only when a cylinder is stopped in its compression stroke or the piston position moved with the starter 6 as described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A starting device for a direct-injection internal combustion engine, in which fuel can be injected directly into cylinders, comprising:
    cylinder identifying means for identifying at least a compression stroke cylinder in a compression stroke when the internal combustion engine is stopped;
    start request determining means for determining whether there is an engine start request for the internal combustion engine; and
    start control means for injecting fuel into the compression stroke cylinder identified by the cylinder identifying means at a start of the internal combustion engine, when it is determined by the start request determining means that there is an engine start request for the internal combustion engine.

2. The starting device for a direct-injection internal combustion engine according to claim 1, further comprising:
    engine temperature detecting means for detecting an engine temperature of the internal combustion engine;
    piston position detecting means for detecting a position of a piston in the identified compression stroke cylinder; and
    ignition region determining means for determining, on the basis of the engine temperature detected by the engine temperature detecting means and the piston position detected by the piston position detecting means, whether or not fuel injected into the identified compression stroke cylinder will be in an ignition region.

3. The starting device for a direct-injection internal combustion engine according to claim 2, wherein the start control means controls fuel injection for the identified compression stroke cylinder such that a quick starting is performed when it is determined that fuel injected into the identified compression stroke cylinder will be in the ignition region, and the start control means controls fuel injection for an intake stroke cylinder identified by the cylinder identifying means during its intake stroke such that a normal starting is performed when it is determined that fuel injected into the identified compression stroke cylinder will not be in the ignition region.

4. The starting device for a direct-injection internal combustion engine according to claim 2, further comprising:
    piston position correcting means for moving the position of the piston of either the identified compression stroke cylinder or the cylinder to enter its compression stroke next after the identified compression stroke cylinder so that the position of the piston becomes such that fuel injected into the cylinder will be in the ignition region when it is determined that the piston position detected by the piston position detecting means is such that fuel injected into the identified compression stroke cylinder will not be in the ignition region.

5. The starting device for a direct-injection internal combustion engine according to claim 1, further comprising:
    stop condition recognizing means for determining whether or not engine automatic stop conditions are established;
    automatic engine stopping means for automatically stopping the internal combustion engine when it is determined, by the stop condition recognizing means, that the automatic engine stop conditions are established; and
    start condition determining means for determining whether or not engine automatic start conditions are established when the internal combustion engine has been automatically stopped by the automatic engine stopping means,
    wherein the start request determining means determines that there is an engine start request when it is determined by the start condition determining means that the engine automatic start conditions are established.

6. The starting device for a direct-injection internal combustion engine according to claim 1, wherein the start request determining means determines that there is an engine start request when an ignition switch provided in a vehicle, in which the internal combustion engine is mounted, is turned to a start position.

7. A starting device for a direct-injection internal combustion engine, comprising:
cylinder identifying means for identifying at least a compression stroke cylinder in a compression stroke when the internal combustion engine is stopped;
piston position detecting means for a position of a piston in the cylinder identified by the cylinder identifying means;
start request determining means for determining whether or not there is an engine start request for the internal combustion engine;
combustion parameter setting means for setting a fuel injection quantity and a fuel injection timing in correspondence with the piston position detected by the piston position detecting means to suppress abnormal combustion of the injected fuel; and
start control means for controlling fuel injection for the identified cylinder, at a start of the internal combustion engine, on the basis of the set fuel injection quantity and the set fuel injection timing set by the combustion parameter setting means when it is determined by the start request determining means that there is an engine start request of the internal combustion engine.

8. The starting device for a direct-injection internal combustion engine according to claim 7, further comprising:
engine temperature detecting means for detecting an engine temperature of the internal combustion engine; and
ignition region determining means for determining, on the basis of the engine temperature detected by the engine temperature detecting means and the piston position detected by the piston position detecting means, whether or not fuel injected into the identified compression stroke cylinder will be in an ignition region.

9. The starting device for a direct-injection internal combustion engine according to claim 7, wherein the combustion parameter setting means sets the fuel injection quantity further to an increase side as the piston position, before starting of the internal combustion engine, is closer to bottom dead center.

10. The starting device for a direct-injection internal combustion engine according to claim 7, wherein the combustion parameter setting means sets an ignition timing to suppress abnormal combustion of the injected fuel, and the start control means, when it is determined by the start request determining means that there is an engine start request of the internal combustion engine, controls fuel injection for the identified cylinder on the basis of the fuel injection quantity and the fuel injection timing set by the combustion parameter setting means and controls ignition for the injected fuel into the identified cylinder on the basis of the ignition timing set by the combustion parameter setting means.

11. The starting device for a direct-injection internal combustion engine according to claim 10, wherein the combustion parameter setting means sets the ignition timing further to a retard side as the piston position, before starting of the internal combustion engine, is closer to bottom dead center.

12. The starting device for a direct-injection internal combustion engine according to claim 7, further comprising:
engine temperature detecting means for detecting an engine temperature of the internal combustion engine, wherein the combustion parameter setting means sets a basic fuel injection quantity and a basic fuel injection timing in correspondence with the piston position detected by the piston position detecting means and the engine temperature detected by the engine temperature detecting means, and the combustion parameter setting means corrects at least one of the combustion parameters that are the set basic fuel injection quantity and the set basic fuel injection timing for the identified cylinder in correspondence with the piston position detected by the piston position detecting means to suppress abnormal combustion of the injected fuel.

13. The starting device for a direct-injection internal combustion engine according to claim 12, wherein the combustion parameter setting means sets a basic ignition timing for the injected fuel into the identified cylinder in correspondence with the piston position detected by the piston position detecting means and the engine temperature detected by the engine temperature detecting means, and the combustion parameter setting means corrects the combustion parameter that is the set basic ignition timing in correspondence with the piston position detected by the piston position detecting means to suppress abnormal combustion of the injected fuel.

14. The starting device for a direct-injection internal combustion engine according to claim 7, wherein the cylinder identifying means identifies a first compression stroke cylinder in its compression stroke and a second compression stroke cylinder to enter its compression stroke immediately after the first compression stroke cylinder on starting while the engine is stopped, and the combustion parameter setting means sets, respectively, a fuel injection quantity and a fuel injection timing for each of these cylinders in correspondence with the piston position detected by the piston position detecting means to suppress abnormal combustion of the injected fuel, and the start control means, when it is determined by the start request determining means that there is an engine start request of the internal combustion engine, controls fuel injection for the first compression stroke cylinder on the basis of the fuel injection quantity and the fuel injection timing set by the combustion parameter setting means and then controls fuel injection for the second compression stroke cylinder on the basis of the fuel injection quantity and the fuel injection timing set by the combustion parameter setting means.

15. A starting device for a direct-injection internal combustion engine according to claim 7, wherein the cylinder identifying means identifies a first compression stroke cylinder in its compression stroke and a second compression stroke cylinder to enter its compression stroke immediately after the first compression stroke cylinder on starting while the engine is stopped, and the combustion parameter setting means sets respective a fuel injection quantity and a fuel injection timing for the second compression stroke cylinder in correspondence with the piston position detected by the piston position detecting means to suppress abnormal combustion of the injected fuel, and the start control means controls fuel injection for the second compression stroke cylinder on the basis of the fuel injection quantity and the fuel injection timing set by the combustion parameter setting means when it is determined by the start request determining means that there is an engine start request of the internal combustion engine.

16. The starting device for a direct-injection internal combustion engine according to claim 7, wherein the combustion parameter setting means sets a fuel injection quantity and a fuel injection timing on the basis of a plurality of preset maps that store data related to combustion states of the injected fuel.

17. The starting device for a direct-injection internal combustion engine according to any one of claims 7, 10, or 12–15, wherein abnormal combustion of the injected fuel is either one of a state such that the combustion speed of the fuel after it is ignited is rapid and a state such that self-ignition of the fuel occurs before ignition induced by igniting.

18. A start control method for a direct-injection internal combustion engine, comprising:

identifying at least a compression stroke cylinder in a compression stroke when the internal combustion engine is stopped;

determining whether or not there is an engine start request for the internal combustion engine; and injecting fuel into the identified compression stroke cylinder at a start of the internal combustion engine when it is determined that there is an engine start request of the internal combustion engine.

19. The start control method for a direct-injection internal combustion engine according to claim 18, further comprising:

detecting an engine temperature of the internal combustion engine;

detecting a position of a piston in the identified compression stroke cylinder; and determining whether or not fuel injected into the identified compression stroke cylinder will be in an ignition region on the basis of the detected engine temperature and the detected piston position.

20. The start control method for a direct-injection internal combustion engine according to claim 19, wherein the step of injecting fuel includes the step of, controlling fuel injection for the identified compression stroke cylinder such that quick starting is performed when it is determined that fuel injected into the identified compression stroke cylinder will be in the ignition region, and controlling fuel injection for an intake stroke cylinder identified by the cylinder identifying means during its intake stroke such that normal starting is performed when it is determined that fuel injected into the identified compression stroke cylinder will not be in the ignition region.

21. A start control method for a direct-injection internal combustion engine, comprising:

identifying at least a compression stroke cylinder in a compression stroke when the internal combustion engine is stopped;

detecting a position of a piston in the identified cylinder;

determining whether or not there is an engine start request for the internal combustion engine;

setting a fuel injection quantity and a fuel injection timing in correspondence with the detected piston position to suppress abnormal combustion of the injected fuel; and controlling fuel injection for the identified cylinder at a start of the internal combustion engine on the basis of the set fuel injection quantity and the set fuel injection timing when it is determined that there is an engine start request of the internal combustion engine.

22. The start control method for a direct-injection internal combustion engine according to claim 21, wherein the setting step includes the step of, setting an ignition timing to suppress abnormal combustion of the injected fuel, and controlling fuel injection for the identified cylinder on the basis of the set fuel injection quantity and the set fuel injection timing and then controlling ignition for the injected fuel into the identified cylinder on the basis of the set ignition timing when it is determined that there is an engine start request for the internal combustion engine.

23. The start control method for a direct-injection internal combustion engine according to claim 21, further comprising:

detecting an engine temperature of the internal combustion engine; and setting a basic fuel injection quantity and a basic fuel injection timing for the identified cylinder in correspondence with the detected piston position and the detected engine temperature, correcting at least one of the combustion parameters that are the set basic fuel injection quantity and the set basic fuel injection timing in correspondence with the detected piston position to suppress abnormal combustion of the injected fuel.

24. The start control method for a direct-injection internal combustion engine according to claim 21, wherein the setting step includes the step of, setting a basic ignition timing for the injected fuel into the identified cylinder in correspondence with the detected piston position and the detected temperature, and correcting the combustion parameter that is the set basic spark timing in correspondence with the detected piston position to suppress abnormal combustion of the injected fuel.

* * * * *